(12) United States Patent
Ding et al.

(10) Patent No.: US 10,677,947 B1
(45) Date of Patent: Jun. 9, 2020

(54) HORIZONTAL FRACTURE PREDICTION METHOD, DEVICE AND EQUIPMENT

(71) Applicant: China University of Petroleum (Beijing), Beijing (CN)

(72) Inventors: Pinbo Ding, Beijing (CN); Bangrang Di, Beijing (CN); Jianxin Wei, Beijing (CN)

(73) Assignee: China University of Petroleum (Beijing), Beijing (CN)

( * ) Notice: Subject to any disclaimer, the term of this patent is extended or adjusted under 35 U.S.C. 154(b) by 0 days.

(21) Appl. No.: 16/536,402

(22) Filed: Aug. 9, 2019

(30) Foreign Application Priority Data

Dec. 10, 2018 (CN) .......................... 2018 1 1502830

(51) Int. Cl.
  *G01V 1/30* (2006.01)
  *G01V 1/28* (2006.01)

(52) U.S. Cl.
  CPC .............. *G01V 1/303* (2013.01); *G01V 1/284* (2013.01); *G01V 2210/6222* (2013.01); *G01V 2210/646* (2013.01)

(58) Field of Classification Search
  CPC ............. G01V 1/284; G01V 2210/586; G01V 2210/626; G01V 2210/6245; G01V 1/303
  See application file for complete search history.

(56) References Cited

U.S. PATENT DOCUMENTS

| 6,556,921 | B1 | 4/2003 | Hardage et al. | |
| 2018/0030815 | A1* | 2/2018 | Eftekhari Far | ......... E21B 43/26 |
| 2018/0203146 | A1* | 7/2018 | den Boer | ............... G01V 1/306 |

FOREIGN PATENT DOCUMENTS

| CN | 103 076633 B | 10/2014 |
| CN | 104 407378 A | 3/2015 |

(Continued)

OTHER PUBLICATIONS

Poisson's Ratio, Schlumberger Oilfield Glossary, © 2017 Schlumberger Limited, https://web.archive.org/web/20170620025550/https://www.glossary.oilfield.slb.com/en/Terms/p/poissons_ratio.aspx, Jun. 20, 2007 (Year: 2007).*

(Continued)

*Primary Examiner* — Michael J Dalbo
(74) *Attorney, Agent, or Firm* — Volpe and Koenig, P.C.

(57) ABSTRACT

The present disclosure provides a horizontal fracture prediction method, device and equipment. The method comprises: acquiring primary wave velocities and shear wave velocities of first and second incidence angle directions of seismic waves at a target fracture location, wherein a first incidence angle is smaller than a second incidence angle, and the incidence angles are included angles between propagation directions of the seismic waves and a surface normal direction of a target fracture; calculating a first primary wave/shear wave velocity ratio and a first shear wave splitting (SWS) coefficient of the first incidence angle direction; calculating a second primary wave/shear wave velocity ratio of the second incidence angle direction; and determining that the target fracture is a horizontal fracture under the condition that the first SWS coefficient is smaller than a first preset value and a ratio of the first primary wave/shear wave velocity ratio to the second primary wave/shear wave velocity ratio is smaller than a second preset value. According to embodiments of the present disclosure, whether the target fracture is the horizontal fracture or not is determined through calculating the primary wave/shear wave velocity ratio and the first SWS coefficient of the first incidence angle direction and the primary wave/shear wave velocity ratio of the second incidence angle direction, so that effective data are provided for exploration and development of coal-bed gas and shale gas.

12 Claims, 4 Drawing Sheets

(56) References Cited

FOREIGN PATENT DOCUMENTS

CN         108 459346 A     8/2018
CN         108 957548 A    12/2018

OTHER PUBLICATIONS

"Prediction of Fracture Direction Using Three-component VSP Data". Journal of Shengli Oilfield Staff University vol. 20, No. 3, Jun. 2006. Translation attached.

* cited by examiner

HORIZONTAL FRACTURE PREDICTION METHOD, DEVICE AND EQUIPMENT

CROSS REFERENCE TO RELATED APPLICATIONS

This application claims the benefit of Chinese Patent Application No. 201811502830.9, filed Dec. 10, 2018, which is incorporated by reference as if fully set forth herein.

FIELD OF THE INVENTION

The present disclosure relates to the technical field of geophysical exploration and development and particularly relates to a horizontal fracture prediction method, device and equipment.

BACKGROUND OF THE INVENTION

Fractures are extensively distributed in underground rocks, have all-important influence on propagation of seismic waves and also play a critical role in storing and migrating subsurface fluids. Therefore, feature description of formation fractures is an important research content of fractured oil and gas reservoirs. Under the action of tectonic movement, rocks will generate high-angle fractures, also called vertical fractures, which are major research objects in conventional oil-gas exploration. Besides, in shale and coal beds, horizontally-distributed natural fractures, also called horizontal fractures, are developed under the influence caused by factors such as oriented arrangement of minerals and action of geostress. Wherein, the horizontal fractures provide reservoir spaces for shale gas and coal-bed gas and play an all-important role in gas content of reservoir beds, so that the prediction of the horizontal fractures has an important significance in exploration and development of the shale gas, the coal-bed gas, etc.

The existing fracture prediction methods, for example a shear-wave splitting (SWS) based formation fracture prediction method can only be used for effectively predicting the vertical fractures and cannot be used for identifying the horizontal fractures during the prediction of the fractures.

In view of how to predict the horizontal fractures, an effective solution is not proposed yet at present.

SUMMARY OF THE INVENTION

Embodiments of the present disclosure provide a horizontal fracture prediction method which is used for solving the problem in the prior art that a horizontal fracture cannot be effectively predicted.

The horizontal fracture prediction method provided by the embodiments of the present disclosure comprises: acquiring a primary wave velocity and a shear wave velocity of a first incidence angle direction and a primary wave velocity and a shear wave velocity of a second incidence angle direction of seismic waves at a target fracture location, wherein a first incidence angle is smaller than a second incidence angle, and the incidence angles are included angles between propagation directions of the seismic waves and a surface normal direction of a target fracture; calculating a first primary wave/shear wave velocity ratio and a first shear-wave splitting (SWS) coefficient of the first incidence angle direction according to the primary wave velocity and shear wave velocity of the first incidence angle direction; calculating a second primary wave/shear wave velocity ratio of the second incidence angle direction according to the primary wave velocity and shear wave velocity of the second incidence angle direction; and determining that the target fracture is a horizontal fracture under the condition that the first SWS coefficient is smaller than a first preset value and a ratio of the first primary wave/shear wave velocity ratio to the second primary wave/shear wave velocity ratio is smaller than a second preset value.

In one embodiment, the step of calculating the first SWS coefficient of the first incidence angle direction according to the primary wave velocity and shear wave velocity of the first incidence angle direction comprises: acquiring a fast shear wave velocity and a slow shear wave velocity of the first incidence angle direction according to the shear wave velocity of the first incidence angle direction; and calculating the first SWS coefficient according to the fast shear wave velocity and slow shear wave velocity of the first incidence angle direction.

In one embodiment, the first SWS coefficient is calculated according to the fast shear wave velocity and slow shear wave velocity of the first incidence angle direction according to a formula as follows:

$$SWS1=(Vs11-Vs21)/Vs21$$

Wherein, $Vs11$ means the fast shear wave velocity of the first incidence angle direction; $Vs21$ means the slow shear wave velocity of the first incidence angle direction; and $SWS1$ means the first SWS coefficient.

In one embodiment, after the target fracture is determined as the horizontal fracture, the method further comprises: acquiring a fast shear wave velocity and a slow shear wave velocity of the second incidence angle direction; calculating a second SWS coefficient of the second incidence angle direction according to the fast shear wave velocity and the slow shear wave velocity of the second incidence angle direction; taking the second SWS coefficient as fracture density of the target fracture; and determining the development degree of the target fracture according to the fracture density.

In one embodiment, the second SWS coefficient of the second incidence angle direction is calculated according to the fast shear wave velocity and slow shear wave velocity of the second incidence angle direction according to a formula as follows:

$$SWS2=(Vs12-Vs22)/Vs22$$

Wherein, $Vs12$ means the fast shear wave velocity of the second incidence angle direction, $Vs22$ means the slow shear wave velocity of the second incidence angle direction, and $SWS2$ means the second SWS coefficient.

In one embodiment, the step of determining the development degree of the target fracture according to the fracture density comprises: judging a preset range to which the fracture density belongs; determining the development degree of the target fracture as a fracture nondevelopment zone when the fracture density belongs to a first preset range; determining the development degree of the target fracture as a fracture sub-development zone when the fracture density belongs to a second preset range; and determining the development degree of the target fracture as a fracture development zone when the fracture density belongs to a third preset range.

In one embodiment, the first incidence angle is greater than or equal to 0° and is smaller than or equal to 20°; and the second incidence angle is greater than or equal to 70° and is smaller than or equal to 90°.

Embodiments of the present disclosure further provide a horizontal fracture prediction device, comprising: an acquisition module, which is used for acquiring a primary wave velocity and a shear wave velocity of a first incidence angle direction and a primary wave velocity and a shear wave velocity of a second incidence angle direction of seismic waves at a target fracture location, wherein a first incidence angle is smaller than a second incidence angle, and the incidence angles are included angles between propagation directions of the seismic waves and a surface normal direction of a target fracture; a first calculation module, which is used for calculating a first primary wave/shear wave velocity ratio and a first shear-wave splitting (SWS) coefficient of the first incidence angle direction according to the primary wave velocity and shear wave velocity of the first incidence angle direction; a second calculation module, which is used for calculating a second primary wave/shear wave velocity ratio of the second incidence angle direction according to the primary wave velocity and shear wave velocity of the second incidence angle direction; and a processing module, which is used for determining that the target fracture is a horizontal fracture under the condition that the first SWS coefficient is smaller than a first preset value and a ratio of the first primary wave/shear wave velocity ratio to the second primary wave/shear wave velocity ratio is smaller than a second preset value.

In one embodiment, the first calculation module comprises: a first acquisition unit, which is used for acquiring a fast shear wave velocity and a slow shear wave velocity of the first incidence angle direction according to the shear wave velocity of the first incidence angle direction; and a first calculation unit, which is used for calculating the first SWS coefficient according to the fast shear wave velocity and slow shear wave velocity of the first incidence angle direction.

In one embodiment, the first SWS coefficient is calculated by the first calculation unit according to a formula as follows:

$$SWS1=(Vs11-Vs21)/Vs21$$

Wherein, Vs11 means the fast shear wave velocity of the first incidence angle direction; Vs21 means the slow shear wave velocity of the first incidence angle direction; and SWS1 means the first SWS coefficient.

In one embodiment, the processing module further comprises: a second acquisition unit, which is used for acquiring a fast shear wave velocity and a slow shear wave velocity of the second incidence angle direction after the target fracture is determined as the horizontal fracture; a second calculation unit, which is used for calculating a second SWS coefficient of the second incidence angle direction according to the fast shear wave velocity and the slow shear wave velocity of the second incidence angle direction; a processing unit, which is used for taking the second SWS coefficient as fracture density of the target fracture; and a determination unit, which is used for determining the development degree of the target fracture according to the fracture density.

In one embodiment, the second SWS coefficient is calculated by the second calculation unit according to a formula as follows:

$$SWS2=(Vs12-Vs22)/Vs22$$

Wherein, Vs12 means the fast shear wave velocity of the second incidence angle direction, Vs22 means the slow shear wave velocity of the second incidence angle direction, and SWS2 means the second SWS coefficient.

In one embodiment, the determination unit is further used for judging a preset range to which the fracture density belongs; determining the development degree of the target fracture as a fracture nondevelopment zone when the fracture density belongs to a first preset range; determining the development degree of the target fracture as a fracture sub-development zone when the fracture density belongs to a second preset range; and determining the development degree of the target fracture as a fracture development zone when the fracture density belongs to a third preset range.

Embodiments of the present disclosure further provide a horizontal fracture prediction equipment, comprising a processor and a memory for storing processor executable instructions, wherein steps of the horizontal fracture prediction method are achieved when the instructions are executed by the processor.

Embodiments of the present disclosure further provide a computer readable storage medium storing computer instructions, wherein steps of the horizontal fracture prediction method are achieved when the instructions are executed.

In embodiments of the present disclosure, a horizontal fracture prediction method is provided. A first primary wave/shear wave velocity ratio and a first SWS coefficient of a first incidence angle direction and a second primary wave/shear wave velocity ratio of a second incidence angle direction are calculated, and whether a target fracture is a horizontal fracture or not is determined according to the obtained first SWS coefficient, the first primary wave/shear wave velocity ratio and the second primary wave/shear wave velocity ratio, so that effective data are provided for exploration and development of coal-bed gas and shale gas, and then, the yield of the coal-bed gas and shale gas is effectively increased.

BRIEF DESCRIPTION OF THE DRAWINGS

Drawings described herein are used for providing further comprehension for the present disclosure, form part of the present application, but not define the present disclosure. In the drawings.

DETAILED DESCRIPTION OF THE EMBODIMENTS

The principle and spirit of the present disclosure will be described below with reference to a plurality of demonstrative embodiments. It should be understood that presenting of these embodiments is only intended to make those skilled in the art better comprehend and then implement the present disclosure, rather than limiting the scope of the present disclosure in any way. Contrarily, the presenting of these embodiments is intended to make the present application disclosure more thorough and complete, and the scope of the present disclosure can be completely transferred to those skilled in the art.

Those skilled in the art know that the embodiments of the present disclosure may be implemented as a system, arrangement, method or computer program product. Therefore, the present application disclosure may be specifically implemented in a form as follows: complete hardware, complete software (including firmware, resident software, microcodes, etc.) or hardware and software combinations.

In view of the existing fracture prediction methods, such as a shear-wave splitting based formation fracture prediction method, a propagation path of excited seismic waves is approximately perpendicular to a horizontal fracture plane, and anisotropic features of a horizontal fracture location are not represented, so that the method can only be used for effectively predicting vertical fractures and cannot be used for effectively predicting horizontal fractures when fractures are predicted by using the method.

Figure 1:
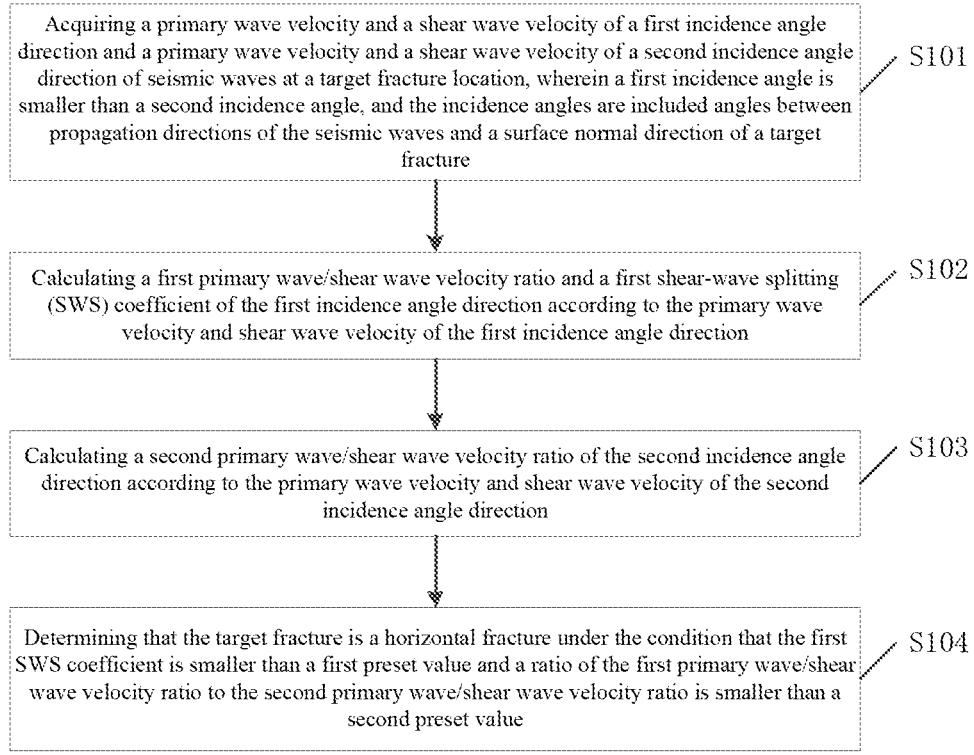
FIG. 1 is a schematic diagram of steps of a horizontal fracture prediction method provided by embodiments of the present disclosure.

Based on the above-mentioned problem that horizontal fractures cannot be effectively predicted, embodiments of the present disclosure provide a horizontal fracture prediction method, referring to FIG. 1, and the method may comprise the following steps.

Step S101: a primary wave velocity and a shear wave velocity of a first incidence angle direction and a primary wave velocity and a shear wave velocity of a second incidence angle direction of seismic waves at a target fracture location are acquired, wherein a first incidence angle is smaller than a second incidence angle, and the incidence angles are included angles between propagation directions of the seismic waves and a surface normal direction of a target fracture.

Multiwave seismic exploration is a method for exploring formations through comprehensively utilizing a variety of seismic waves such as primary waves and shear waves (or converted waves), accordingly, multiwave seismic data carry formation lithologic information richer than components of separate waves (the primary waves), particularly formation fracture information. Therefore, the primary wave velocity and shear wave velocity of the first incidence angle direction and the primary wave velocity and shear wave velocity of the second incidence angle direction can be obtained through performing preprocessing and velocity analysis on the acquired multiwave seismic data of the target fracture location. Wherein, the preprocessing comprises, but not limited to, denoising, amplitude compensating and gaining; and the velocity analysis comprises, but not limited to, acquiring a seismic wave correcting velocity through velocity scanning.

The above-mentioned first incidence angle is smaller than the second incidence angle, specifically, the first incidence angle is greater than or equal to 0° and is smaller than or equal to 20°, and the second incidence angle is greater than or equal to 70° and is smaller than or equal to 90°. Wherein, the above-mentioned incidence angles may be included angles between the propagation directions of the seismic waves and a plane normal direction of the fracture. Further, in seismic exploration, numerous source points (locations of seismic focuses exciting the seismic waves) and receiver points (locations of wave detectors receiving the seismic waves) compose an observation system. Therefore, seismic wave incidence-reflection paths of different angles are present, and the propagation directions of the seismic waves can be determined according to source point-receiver point space locations in the observation system.

The incidence angles are in a range of 0° (namely perpendicular to a fracture plane) to 90° (namely parallel to the fracture plane); and in the multiwave seismic data, proper spacing among the seismic wave incidence-reflection paths of all the different angles can be selected, and thus, the condition that multiwave seismic data of only one direction between 0° and 20° and between 70° and 90° are present is guaranteed, namely, the first incidence angle and the second incidence angle are unique.

Step S102: a first primary wave/shear wave velocity ratio and a first shear-wave splitting (SWS) coefficient of the first incidence angle direction are calculated according to the primary wave velocity and shear wave velocity of the first incidence angle direction.

In respect that when seismic shear waves are propagated in a fracture-containing anisotropic medium, an SWS phenomenon will occur to form fast shear waves and slow shear waves, the degree of difference between the fast shear waves and the slow shear waves is proportional to the degree of development of formation fractures, and the SWS phenomenon mainly embodies fracture information. Therefore, a fast shear wave velocity and a slow shear wave velocity of the first incidence angle direction can be acquired from the multiwave seismic data of the target fracture location, and the first SWS coefficient is calculated according to the fast shear wave velocity and the slow shear wave velocity of the first incidence angle direction. Wherein, the first SWS coefficient is obtained through a formula below:

$$SWS1=(Vs11-Vs21)/Vs21$$

Wherein, $Vs11$ means the fast shear wave velocity of the first incidence angle direction; $Vs21$ means the slow shear wave velocity of the first incidence angle direction; and $SWS1$ means the first SWS coefficient.

Further, the first primary wave/shear wave velocity ratio is a value obtained by dividing the primary wave velocity by the shear wave velocity of the first incidence angle direction of the target fracture location.

Step S103: a second primary wave/shear wave velocity ratio of the second incidence angle direction is calculated according to the primary wave velocity and shear wave velocity of the second incidence angle direction.

The second primary wave/shear wave velocity ratio is a value obtained by dividing the primary wave velocity by the shear wave velocity of the second incidence angle direction of the target fracture location.

Step S104: it is determined that the target fracture is a horizontal fracture under the condition that the first SWS coefficient is smaller than a first preset value and a ratio of the first primary wave/shear wave velocity ratio to the second primary wave/shear wave velocity ratio is smaller than a second preset value.

Wherein, the first preset value may be 0.02, and the second preset value may be 0.8. When the first SWS coefficient is smaller than 0.02 and the ratio of the first primary wave/shear wave velocity ratio to the second primary wave/shear wave velocity ratio is smaller than 0.8, it can be determined that the target fracture is a horizontal fracture. It is understandable that the first preset value and the second preset value may also be set as other reasonable values according to actual situations and are not defined in the present application.

Fracture density is a conceptual value representing a fracture development degree and is used for reflecting the fracture development degree. The target fracture can be divided into a fracture development zone, a fracture sub-development zone or a fracture nondevelopment zone according to the fracture density; and in one embodiment, the second SWS coefficient can serve as the fracture density of the target fracture to determine the development degree of the target fracture.

Specifically, after the target fracture is determined as the horizontal fracture, a fast shear wave velocity and a slow shear wave velocity of the second incidence angle direction can be acquired from the multiwave seismic data of the target fracture location, and the second SWS coefficient is calculated according to the fast shear wave velocity and slow shear wave velocity of the second incidence angle direction. Wherein, the second SWS coefficient is obtained through a formula below:

$$SWS2=(Vs12-Vs22)/Vs22$$

Wherein, Vs12 means the fast shear wave velocity of the second incidence angle direction; Vs22 means the slow shear wave velocity of the second incidence angle direction; and SWS2 means the second SWS coefficient.

Then, the development degree of the target fracture is determined according to the fracture density by taking the second SWS coefficient as fracture density of the target fracture. Firstly, a preset range to which the fracture density belongs is judged; when the fracture density belongs to a first preset range, the development degree of the target fracture is determined as a fracture nondevelopment zone; when the fracture density belongs to a second preset range, the development degree of the target fracture is determined as a fracture sub-development zone; and when the fracture density belongs to a third preset range, the development degree of the target fracture is determined as a fracture development zone. Wherein, the first preset range may be smaller than 0.02, the second preset range may be greater than or equal to 0.02 and smaller than or equal to 0.08, and the third preset range may be greater than 0.08. It is explanatory that the above-mentioned three preset ranges may be set as other reasonable values according to actual situations and are not defined in the present application.

The above-mentioned method is described below with reference to one specific embodiment. However, it is noteworthy that the specific embodiment is only used for better describing the present application, but not improperly defining the present application.

Figure 2:
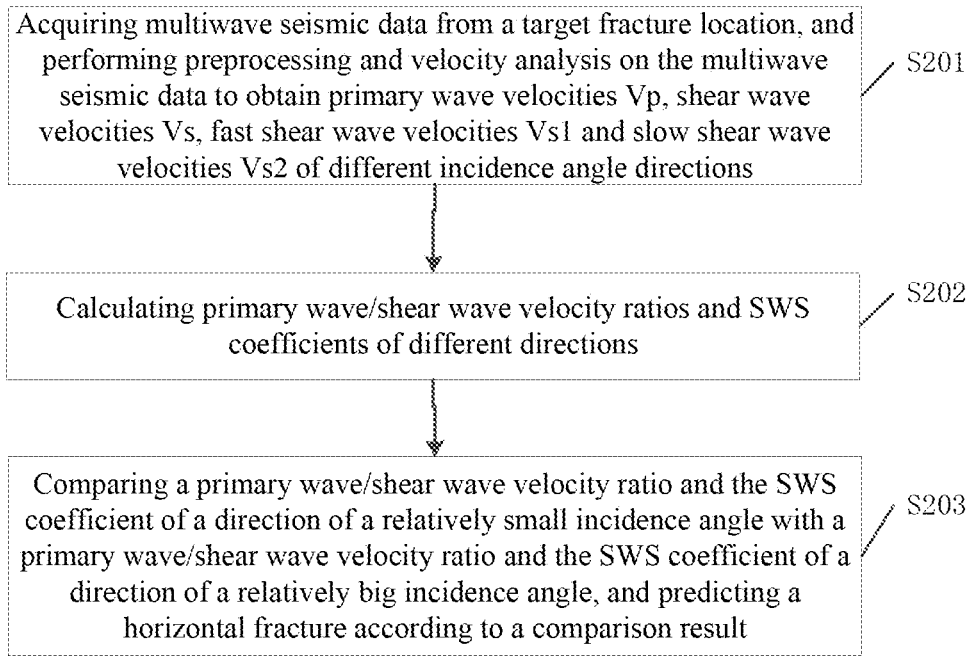
FIG. 2 is a schematic diagram of a horizontal fracture prediction method provided by specific embodiments of the present disclosure.

Embodiments of the present disclosure provide a horizontal fracture prediction method, referring to FIG. 2, and the method may comprise the following steps.

Step 201: multiwave seismic data are acquired from a target fracture location, and preprocessing and velocity analysis are performed on the multiwave seismic data to obtain primary wave velocities Vp, shear wave velocities Vs, fast shear wave velocities Vs1 and slow shear wave velocities Vs2 of different incidence angle directions.

Wherein, the preprocessing comprises denoising, amplitude compensating and gaining; and the velocity analysis specifically comprises acquiring a seismic wave correcting velocity through performing velocity scanning on the multiwave seismic data, and performing analysis to obtain the primary wave velocities Vp, the shear wave velocities Vs, the fast shear wave velocities Vs1 and the slow shear wave velocities Vs2 of different incidence angle directions.

Step 202: primary wave/shear wave velocity ratios and SWS coefficients of different directions are calculated.

Wherein, the primary wave/shear wave velocity ratios are values obtained by dividing the primary wave velocities Vp by the shear wave velocities Vs.

In respect that when seismic shear waves are propagated in a fracture-containing anisotropic medium, an SWS phenomenon will occur to form fast shear waves and slow shear waves, the degree of difference between the fast shear waves and the slow shear waves is proportional to the degree of development of formation fractures, and the SWS phenomenon mainly embodies fracture information. Therefore, the SWS coefficient can be calculated according to the fast shear wave velocity Vs1 and the slow shear wave velocity Vs2. Wherein, the SWS coefficient is obtained through a formula below:

$$SWS=(Vs1-Vs2)/Vs2$$

Step 203: a primary wave/shear wave velocity ratio and the SWS coefficient of a direction of a relatively small incidence angle are compared with a primary wave/shear wave velocity ratio and the SWS coefficient of a direction of a relatively big incidence angle, and a horizontal fracture is predicted according to a comparison result.

Wherein, the above-mentioned incidence angles are included angles between the propagation directions of the seismic waves and a plane normal direction of the fracture and are in a range of 0° (namely perpendicular to a fracture plane) to 90° (namely parallel to the fracture plane). In seismic exploration, numerous source points (locations of seismic focuses exciting the seismic waves) and receiver points (locations of wave detectors receiving the seismic waves) compose an observation system. Therefore, seismic wave incidence-reflection paths of different angles are present, and the incidence angles can be determined according to source point-receiver point space locations in the observation system. Wherein, the direction of the relatively small incidence angle is a direction of an incidence angle in a range of 0°-20°, and the direction of the relatively big incidence angle is a direction of an incidence angle in a range of 70°-90°.

A judgment basis for predicting the horizontal fracture is as follows: the target fracture is determined as the horizontal fracture under the condition that the SWS coefficient of the relatively small incidence angle is smaller than 0.02 and a ratio of the primary wave/shear wave velocity ratio of the direction of the relatively small incidence angle to the primary wave/shear wave velocity ratio of the direction of the relatively big incidence angle is smaller than 0.8.

Further, fracture density is a conceptual value representing a fracture development degree and is used for reflecting the fracture development degree. The target fracture can be divided into a fracture development zone, a fracture sub-development zone or a fracture nondevelopment zone according to the fracture density; and in one specific embodiment, a mode for evaluating a development degree of the horizontal fracture is as follows: the SWS coefficient of the direction of the relatively big incidence angle serves as the fracture density of the target fracture. The development degree of the horizontal fracture is determined according to the fracture density. Firstly, a preset range to which the fracture density belongs is judged; when the fracture density belongs to a first preset range, the development degree of the target fracture is determined as a fracture nondevelopment zone; when the fracture density belongs to a second preset range, the development degree of the target fracture is determined as a fracture sub-development zone; and when the fracture density belongs to a third preset range, the development degree of the target fracture is determined as a fracture development zone. Wherein, the first preset range may be smaller than 0.02, the second preset range may be greater than or equal to 0.02 and smaller than or equal to 0.08, and the third preset range may be greater than 0.08. It is explanatory that the above-mentioned three preset ranges may be set as other reasonable values according to actual situations and are not defined in the present application.

Figure 3:
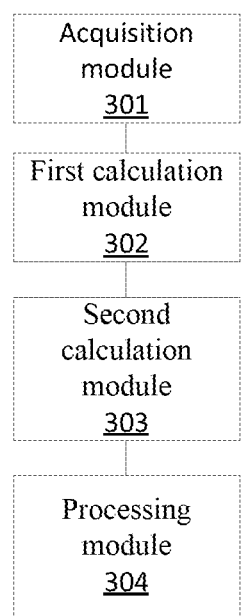
FIG. 3 is a schematic diagram of a horizontal fracture prediction device provided by embodiments of the present disclosure.

Based on the same inventive concept, embodiments of the present disclosure further provide a horizontal fracture prediction device, described in an embodiment as follows. A problem solving principle of the horizontal fracture prediction device is similar to that of the horizontal fracture prediction method, so that the implementation of the horizontal fracture prediction device refers to that of the horizontal fracture prediction method, and repetitions are not explained any more. Terms 'unit' or 'module' used hereinafter can achieve a combination of software and/or hardware of predetermined functions. Although the device described in the embodiment as follows is preferably achieved by software, realization by hardware or combinations of the software and the hardware is also possible and is conceived. FIG. 3 is a structure block diagram of a horizontal fracture prediction device of embodiments of the present disclosure. Referring to FIG. 3, the horizontal fracture prediction device comprises an acquisition module 301, a first calculation module 302, a second calculation module 303 and a processing module 304, and a structure is described as follows.

The acquisition module 301 is used for acquiring a primary wave velocity and a shear wave velocity of a first incidence angle direction and a primary wave velocity and a shear wave velocity of a second incidence angle direction of seismic waves at a target fracture location, wherein a first incidence angle is smaller than a second incidence angle, and the incidence angles are included angles between propagation directions of the seismic waves and a surface normal direction of a target fracture.

Multiwave seismic exploration is a method for exploring formations through comprehensively utilizing a variety of seismic waves such as primary waves and shear waves (or converted waves), accordingly, multiwave seismic data carry formation lithologic information richer than components of separate waves (the primary waves), particularly formation fracture information. Therefore, the primary wave velocity and shear wave velocity of the first incidence angle direction and the primary wave velocity and shear wave velocity of the second incidence angle direction can be obtained through performing preprocessing and velocity analysis on the acquired multiwave seismic data of the target fracture location. Wherein, the preprocessing comprises, but not limited to, denoising, amplitude compensating and gaining; and the velocity analysis comprises, but not limited to, acquiring a seismic wave correcting velocity through velocity scanning.

The above-mentioned first incidence angle is smaller than the second incidence angle, specifically, the first incidence angle may be greater than or equal to 0° and smaller than or equal to 20°, and the second incidence angle may be greater than or equal to 70° and smaller than or equal to 90°. Wherein, the above-mentioned incidence angles may be included angles between the propagation directions of the seismic waves and a plane normal direction of the fracture. Further, in seismic exploration, numerous source points (locations of seismic focuses exciting the seismic waves) and receiver points (locations of wave detectors receiving the seismic waves) compose an observation system. Therefore, seismic wave incidence-reflection paths of different angles are present, and the propagation directions of the seismic waves can be determined according to source point-receiver point space locations in the observation system.

The incidence angles are in a range of 0° (namely perpendicular to a fracture plane) to 90° (namely parallel to the fracture plane); and in the multiwave seismic data, proper spacing among the seismic wave incidence-reflection paths of all the different angles can be selected, and thus, the condition that multiwave seismic data of only one direction between 0° and 20° and between 70° and 90° are present is guaranteed, namely, the first incidence angle and the second incidence angle are unique.

The first calculation module 302 is used for calculating a first primary wave/shear wave velocity ratio and a first shear-wave splitting (SWS) coefficient of the first incidence angle direction according to the primary wave velocity and shear wave velocity of the first incidence angle direction.

In respect that when seismic shear waves are propagated in a fracture-containing anisotropic medium, an SWS phenomenon will occur to form fast shear waves and slow shear waves, the degree of difference between the fast shear waves and the slow shear waves is proportional to the degree of development of formation fractures, and the SWS phenomenon mainly embodies fracture information. In one embodiment, the first calculation module may comprise: a first acquisition unit, which is used for acquiring a fast shear wave velocity and a slow shear wave velocity of the first incidence angle direction from the multiwave seismic data of the target fracture location; and a first calculation unit, which is used for calculating the first SWS coefficient according to the fast shear wave velocity and slow shear wave velocity of the first incidence angle direction. Wherein, the first SWS coefficient is obtained through a formula below:

$$SWS1=(Vs11-Vs21)/Vs21$$

Wherein, Vs11 means the fast shear wave velocity of the first incidence angle direction; Vs21 means the slow shear wave velocity of the first incidence angle direction; and SWS1 means the first SWS coefficient.

Further, the first primary wave/shear wave velocity ratio is a value obtained by dividing the primary wave velocity by the shear wave velocity of the first incidence angle direction of the target fracture location.

The second calculation module 303 is used for calculating a second primary wave/shear wave velocity ratio of the second incidence angle direction according to the primary wave velocity and shear wave velocity of the second incidence angle direction.

The second primary wave/shear wave velocity ratio may be a value obtained by dividing the primary wave velocity by the shear wave velocity of the second incidence angle direction of the target fracture location.

The processing module 304 is used for determining that the target fracture is a horizontal fracture under the condition that the first SWS coefficient is smaller than a first preset value and a ratio of the first primary wave/shear wave velocity ratio to the second primary wave/shear wave velocity ratio is smaller than a second preset value.

Wherein, the first preset value may be 0.02, and the second preset value may be 0.8. When the first SWS coefficient is smaller than 0.02 and the ratio of the first primary wave/shear wave velocity ratio to the second primary wave/shear wave velocity ratio is smaller than 0.8, it can be determined the target fracture is a horizontal fracture. It is understandable that the first preset value and the second preset value may also be set as other reasonable values according to actual situations and are not defined in the present application.

Fracture density is a conceptual value representing a fracture development degree and is used for reflecting the fracture development degree. The target fracture can be divided into a fracture development zone, a fracture sub-development zone or a fracture nondevelopment zone according to the fracture density; and in one embodiment, the second SWS coefficient can serve as the fracture density of the target fracture to determine the development degree of the target fracture.

Specifically, after the target fracture is determined as the horizontal fracture, the processing module further may comprise a second acquisition unit, which is used for acquiring a fast shear wave velocity and a slow shear wave velocity of the second incidence angle direction from the multiwave seismic data of the target fracture location; and a second calculation unit, which is used for calculating the second SWS coefficient according to the fast shear wave velocity and slow shear wave velocity of the second incidence angle direction. Wherein, the second SWS coefficient is obtained through a formula below:

$$SWS2=(Vs12-Vs22)/Vs22$$

Wherein, Vs12 means the fast shear wave velocity of the second incidence angle direction; Vs22 means the slow shear wave velocity of the second incidence angle direction; and SWS2 means the second SWS coefficient.

After the second SWS coefficient is obtained through calculation, the second SWS coefficient serves as the fracture density of the target fracture in a processing unit, and the development degree of the target fracture is determined through a determination unit according to the fracture density of the target fracture location.

Further, the determination unit is further used for judging a preset range to which the fracture density belongs; determining the development degree of the target fracture as a fracture nondevelopment zone when the fracture density belongs to a first preset range; determining the development degree of the target fracture as a fracture sub-development zone when the fracture density belongs to a second preset range; and determining the development degree of the target fracture as a fracture development zone when the fracture density belongs to a third preset range. Wherein, the first preset range may be smaller than 0.02, the second preset range may be greater than or equal to 0.02 and smaller than or equal to 0.08, and the third preset range may be greater than 0.08. It is explanatory that the above-mentioned three preset ranges may be set as other reasonable values according to actual situations and are not defined in the present application.

From descriptions above, it is observed that the embodiments of the present disclosure achieve the following technical effects that: whether a target fracture is a horizontal fracture or not is determined through calculating a primary wave/shear wave velocity ratio and a first SWS coefficient of a first incidence angle direction and a primary wave/shear wave velocity ratio of a second incidence angle direction by using seismic anisotropy and physical features of rocks, and a development degree of the horizontal fracture is further determined through the SWS coefficient, so that horizontal fractures in reservoir beds such as coal beds and shale and development degrees thereof can be effectively predicted, effective data are provided for exploration and development of coal-bed gas and shale gas, and then, the yield of the coal-bed gas and shale gas is effectively increased.

Figure 4:
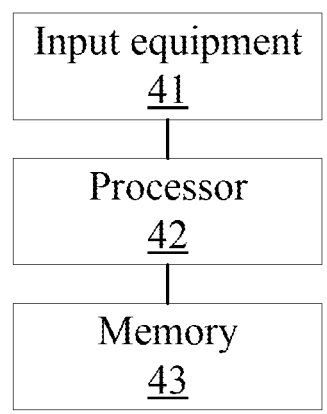
FIG. 4 is a schematic diagram of horizontal fracture prediction electronic equipment provided by embodiments of the present disclosure.

Embodiments of the present application further provide electronic equipment, specifically referring to a composition structural schematic diagram of the electronic equipment based on the horizontal fracture prediction method provided by the embodiments of the present application shown in FIG. 4, and the electronic equipment specifically may comprise input equipment 41, a processor 42 and a memory 43.

Wherein, the input equipment 41 specifically may be used for inputting a primary wave velocity and a shear wave velocity of a first incidence angle direction and a primary wave velocity and a shear wave velocity of a second incidence angle direction of seismic waves at a target fracture location, wherein a first incidence angle is smaller than a second incidence angle, and the incidence angles are included angles between propagation directions of the seismic waves and a surface normal direction of a target fracture. The processor 42 specifically may be used for calculating a first primary wave/shear wave velocity ratio and a first shear-wave splitting (SWS) coefficient of the first incidence angle direction according to the primary wave velocity and shear wave velocity of the first incidence angle direction; calculating a second primary wave/shear wave velocity ratio of the second incidence angle direction according to the primary wave velocity and shear wave velocity of the second incidence angle direction; and determining that the target fracture is a horizontal fracture under the condition that the first SWS coefficient is smaller than a first preset value and a ratio of the first primary wave/shear wave velocity ratio to the second primary wave/shear wave velocity ratio is smaller than a second preset value. The memory 43 specifically may be used for storing parameters such as a primary wave velocity, a shear wave velocity, a fast shear wave velocity and a slow shear wave velocity of the first incidence angle direction and a primary wave velocity, a shear wave velocity, a fast shear wave velocity and a slow shear wave velocity of the second incidence angle direction.

In the present embodiment, the input equipment specifically may be one of main devices for information exchange between a user and a computer system. The input equipment may comprise a keyboard, a mouse, a camera, a scanner, a light pen, a handwriting tablet, a voice input device, etc.; and the input equipment is used for inputting raw data and programs for processing these data into a computer. The input equipment also can be used for acquiring and receiving data transmitted from other modules, units and equipment. The processor may be implemented in any appropriate manner. For example, the processor may be in the form of a microprocessor or processor, a computer readable medium storing computer readable program codes (for example software or firmware) capable of being executed by the (micro)processor, a logic gate, a switch, an application specific integrated circuit (ASIC), a programmable logic controller or an embedded microcontroller. The memory specifically may be a memory device for storing information in modern information technologies. The memory may comprise a plurality of hierarchies, and in digital systems, any device which can save binary data can be called a memory; in integrated circuits, a circuit, which is free of a real object form and has a storing function, is also called a memory, such as RAM and FIFO; and in systems, a storage device with a real object form is also called a memory, such as a memory bank and a TF card.

In the present embodiment, functions and effects specifically achieved by the electronic equipment can be explained in a manner of being compared with other embodiments and are not explained any more.

Embodiments of the present application further provide a computer readable storage medium based on the horizontal fracture prediction method. The computer readable storage medium stores computer programmed instructions, and the effects of determining whether the target fracture is a horizontal fracture or not and further determining a development degree of the horizontal fracture if the target fracture is determined as the horizontal fracture are achieved when the computer programmed instructions are executed.

In the present embodiment, the storage medium comprises, but not limited to, a random access memory (RAM), a read-only memory (ROM), a cache, a hard disk drive (HDD) or a memory card. The memory can be used for storing the computer programmed instructions. A network communication unit may be an interface set according to standards specified by communication protocols and used for performing network communication.

In the present embodiment, functions and effects specifically achieved by the programmed instruction stored by the computer storage medium can be explained in a manner of being compared with other embodiments and are not explained any more.

Apparently, those skilled in the art should understand that all modules or steps of the above-mentioned embodiments of the present disclosure may be implemented with general calculating devices, may be centralized on a single calculating device or distributed on a network composed of a plurality of calculating devices, and optionally, may be implemented with calculating device executable program codes, so that the modules or steps can be stored in memory devices and executed by a calculating device; and under certain circumstances, the steps shown or described may be executed in a sequence different from that herein, or are implemented through separately making the steps into each integrated circuit module or making a plurality of modules or steps thereof into single integrated circuit modules. Thus, the embodiments of the present disclosure are not restricted to any specific hardware and software combination.

It should be understood that descriptions above are intended for graphic illustration rather than restriction. Through reading the above-mentioned descriptions, many embodiments and many applications, besides the provided examples, would be obvious to those skilled in the art. Accordingly, the scope of the present application should not be determined referring to the above-mentioned descriptions, but should be determined referring to full coverage of the fore-mentioned claims and equivalents occupied by these claims.

The above mentioned are only preferred embodiments of the present disclosure and are not intended to restrict the present disclosure; and for those skilled in the art, the embodiments of the present disclosure may have various modifications and variations. Any modification, equivalent replacement, improvement and the like made within the spirit and principle of the present disclosure shall fall within the scope of protection of the present disclosure.

What is claimed is:

1. A horizontal fracture prediction method, comprising:
    acquiring a primary wave velocity and a shear wave velocity of a first incidence angle direction and a primary wave velocity and a shear wave velocity of a second incidence angle direction of seismic waves at a target fracture location, wherein a first incidence angle is smaller than a second incidence angle, and the incidence angles are included angles between propagation directions of the seismic waves and a surface normal direction of a target fracture;
    calculating a first primary wave/shear wave velocity ratio of the first incidence angle direction according to the primary wave velocity and shear wave velocity of the first incidence angle direction;
    acquiring a fast shear wave velocity and a slow shear wave velocity of the first incidence angle direction according to the shear wave velocity of the first incidence angle direction;
    calculating a first shear-wave splitting (SWS) coefficient of the first incidence angle direction according to the fast shear wave velocity and slow shear wave velocity of the first incidence angle direction;
    calculating a second primary wave/shear wave velocity ratio of the second incidence angle direction according to the primary wave velocity and shear wave velocity of the second incidence angle direction; and
    determining that the target fracture is a horizontal fracture under the condition that the first SWS coefficient is smaller than a first preset value and a ratio of the first primary wave/shear wave velocity ratio to the second primary wave/shear wave velocity ratio is smaller than a second preset value.

2. The method according to claim 1, wherein the first SWS coefficient of the first incidence angle direction is calculated according to the fast shear wave velocity and slow shear wave velocity of the first incidence angle direction according to a formula as follows:

$$SWS1=(Vs11-Vs21)/Vs21$$

wherein, Vs1 means the fast shear wave velocity of the first incidence angle direction; Vs21 means the slow shear wave velocity of the first incidence angle direction; and SWS1 means the first SWS coefficient.

3. The method according to claim 1, wherein after the target fracture is determined as the horizontal fracture, the method further comprises:
    acquiring a fast shear wave velocity and a slow shear wave velocity of the second incidence angle direction;
    calculating a second SWS coefficient of the second incidence angle direction according to the fast shear wave velocity and slow shear wave velocity of the second incidence angle direction;
    taking the second SWS coefficient as fracture density of the target fracture; and
    determining the development degree of the target fracture according to the fracture density.

4. The method according to claim 3, wherein the second SWS coefficient of the second incidence angle direction is calculated according to the fast shear wave velocity and slow shear wave velocity of the second incidence angle direction according to a formula as follows:

$$SWS2=(Vs12-Vs22)/Vs22$$

wherein, Vs12 means the fast shear wave velocity of the second incidence angle direction, Vs22 means the slow shear wave velocity of the second incidence angle direction, and SWS2 means the second SWS coefficient.

5. The method according to claim 3, wherein the step of determining the development degree of the target fracture according to the fracture density comprises:
    judging a preset range to which the fracture density belongs;
    determining the development degree of the target fracture as a fracture nondevelopment zone when the fracture density belongs to a first preset range;
    determining the development degree of the target fracture as a fracture sub-development zone when the fracture density belongs to a second preset range; and determining the development degree of the target fracture as a fracture development zone when the fracture density belongs to a third preset range.

6. The method according to claim 1, wherein the first incidence angle is greater than or equal to 0° and is smaller than or equal to 20°; and the second incidence angle is greater than or equal to 70° and is smaller than or equal to 90°.

7. A horizontal fracture prediction equipment, comprising a processor and a memory for storing processor executable instructions, wherein steps of the method according to claim 1 are achieved when the instructions are executed by the processor.

8. A horizontal fracture prediction device, comprising:
means for acquiring a primary wave velocity and a shear wave velocity of a first incidence angle direction and a primary wave velocity and a shear wave velocity of a second incidence angle direction of seismic waves at a target fracture location, wherein a first incidence angle is smaller than a second incidence angle, and the incidence angles are included angles between propagation directions of the seismic waves and a surface normal direction of a target fracture;
means for, calculating a first primary wave/shear wave velocity ratio of the first incidence angle direction according to the primary wave velocity and shear wave velocity of the first incidence angle direction;
means for acquiring a fast shear wave velocity and a slow shear wave velocity of the first incidence angle direction according to the shear wave velocity of the first incidence angle direction;
means for calculating a first shear-wave splitting (SWS) coefficient of the first incidence angle direction according to the fast shear wave velocity and slow shear wave velocity of the first incidence angle direction;
means for calculating a second primary wave/shear wave velocity ratio of the second incidence angle direction according to the primary wave velocity and shear wave velocity of the second incidence angle direction; and
means for determining that the target fracture is a horizontal fracture under the condition that the first SWS coefficient is smaller than a first preset value and a ratio of the first primary wave/shear wave velocity ratio to the second primary wave/shear wave velocity ratio is smaller than a second preset value.

9. The device according to claim 8, wherein the first SWS coefficient is calculated according to a formula as follows:

$$SWS1=(Vs11-Vs21)/Vs21$$

wherein, Vs1 means the fast shear wave velocity of the first incidence angle direction; Vs21 means the slow shear wave velocity of the first incidence angle direction; and SWS1 means the first SWS coefficient.

10. The device according to claim 8, further comprising:
means for acquiring a fast shear wave velocity and a slow shear wave velocity of the second incidence angle direction after the target fracture is determined as the horizontal fracture;
means for, calculating a second SWS coefficient of the second incidence angle direction according to the fast shear wave velocity and slow shear wave velocity of the second incidence angle direction;
means for, taking the second SWS coefficient as fracture density of the target fracture; and
means for, determining the development degree of the target fracture according to the fracture density.

11. The device according to claim 10, wherein the second SWS coefficient is calculated according to a formula as follows:

$$SWS2=(Vs12-Vs22)/Vs22$$

wherein, Vs12 means the fast shear wave velocity of the second incidence angle direction, Vs22 means the slow shear wave velocity of the second incidence angle direction, and SWS2 means the second SWS coefficient.

12. The device according to claim 10, wherein the means for determining the development degree of the target fracture according to the fracture density comprises:
means for judging a preset range to which the fracture density belongs;
means for determining the development degree of the target fracture as a fracture nondevelopment zone when the fracture density belongs to a first preset range;
means for determining the development degree of the target fracture as a fracture sub-development zone when the fracture density belongs to a second preset range; and
means for determining the development degree of the target fracture as a fracture development zone when the fracture density belongs to a third preset range.

* * * * *